United States Patent
Wang et al.

(10) Patent No.: US 11,259,010 B2
(45) Date of Patent: Feb. 22, 2022

(54) DETECTING RELOCATION OF A HEAD-MOUNTED DEVICE

(71) Applicant: Tobii AB, Danderyd (SE)

(72) Inventors: Tiesheng Wang, Danderyd (SE); Pravin Kumar Rana, Danderyd (SE); Yimu Wang, Danderyd (SE); Mark Ryan, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/669,914

(22) Filed: Oct. 31, 2019

(65) Prior Publication Data
US 2020/0195915 A1 Jun. 18, 2020

(51) Int. Cl.
*H04N 13/00* (2018.01)
*H04N 13/383* (2018.01)
*G06F 3/01* (2006.01)
*H04N 13/344* (2018.01)

(52) U.S. Cl.
CPC ........... *H04N 13/383* (2018.05); *G06F 3/013* (2013.01); *H04N 13/344* (2018.05)

(58) Field of Classification Search
CPC ............ H04N 13/00; G06F 3/00; G02B 27/00
See application file for complete search history.

(56) References Cited

U.S. PATENT DOCUMENTS

2019/0156100 A1* 5/2019 Rougeaux .............. A61B 3/113
2019/0243448 A1* 8/2019 Miller ..................... A61B 3/111

\* cited by examiner

*Primary Examiner* — Maryam A Nasri
(74) *Attorney, Agent, or Firm* — Samuel I. Yamron

(57) ABSTRACT

Images of an eye are captured at respective time instances by a camera of a head-mounted device. For each time instance, a position of a center of corneal curvature is estimated using an image captured at that time instance, a position of a pupil center is estimated using an image captured at that time instance, and a line is determined through the estimated corneal curvature center position and the estimated pupil center position. A first estimated position of a center of the eye is computed based on the lines determined for time instances in a first time period. A second estimated position of the center of the eye is computed based on the lines determined for time instances in a second time period. Relocation of the head-mounted device relative to a user's head is detected based on the first and second estimated positions of the eye center.

20 Claims, 9 Drawing Sheets

DETECTING RELOCATION OF A HEAD-MOUNTED DEVICE

CROSS-REFERENCES TO RELATED APPLICATIONS

This application claims priority to Swedish Application No. 1851355-6, filed Oct. 31, 2018; the content of which are hereby incorporated by reference.

TECHNICAL FIELD

The present disclosure relates methods for detecting relocation of a head-mounted device. The present disclosure also relates to corresponding systems and storage media.

BACKGROUND

Performance of head-mounted devices such as virtual-reality (VR) headsets and augmented reality (AR) headsets may be affected if the head-mounted device is not properly mounted at the user's head. Even if the head-mounted device has initially been mounted at a correct position, the head-mounted device may be relocated (or repositioned) during use, for example due to slippage when the head of the user moves or rotates. Lenses or other optical equipment of the head-mounted device may for example be optimized or calibrated for a certain position relative to the user's eyes. If the head-mounted device is adapted to provide a three-dimensional (3D) experience to the user, this 3D experience may become distorted if the head-mounted device moves relative to the user's head. A VR experience provided by the head-mounted device may for example become less realistic, or virtual objects shown by an AR headset may not fit into the real environment as well as they could have done. If the head-mounted device is equipped with gaze tracking, then the gaze tracking performance may also be affected if the head-mounted device moves relative to the user's head. If the user detects that the head-mounted device has slipped, the user may reposition the head-mounted device. While this could restore the performance of the head-mounted device, it could be quite impractical and/or annoying if the user has to do it too often. Moreover, the user may not detect straight away that the head-mounted device has slipped. Hence, the user may potentially continue to use the head-mounted device with reduced performance, without realizing what has happened. It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of a method for detecting relocation (or repositioning) of a head-mounted device relative to a user's head. The method comprises obtaining images of an eye captured at a sequence of time instances (or points in time) by a camera of the head-mounted device. For each of the time instances, the method comprises estimating, using at least one image of the eye captured at that time instance, a position of a center of a corneal curvature of the eye, estimating, using at least one image of the eye captured at that time instance, a position of a center of a pupil of the eye, and determining a line through the estimated position of the center of the corneal curvature and the estimated position of the center of the pupil. The method comprises computing a first estimated position of a center of the eye based on the lines determined for time instances in a first time period, and computing a second estimated position of the center of the eye based on the lines determined for time instances in a second time period. The method comprises detecting, based on the first and second estimated positions of the center of the eye, relocation (or repositioning) of the head-mounted device relative to the user's head.

The inventors have realized that a change in the position of the center of the eye (as perceived from a camera of the head-mounted device, or as determined using images captured by a camera of the head-mounted device) may be employed as an indication that the head-mounted device has been relocated relative to the user's head. The detection of the relocation of the head-mounted device allows for appropriate measures to be taken for example to reduce the effect of this relocation on head-mounted device performance. The user may for example be prompted to reposition the head-mounted device to its original position, or the head-mounted device may for example be recalibrated for operation at the new position. Since at least some head-mounted devices are already equipped with cameras for gaze tracking, such cameras may for example be employed also for detecting relocation of the head-mounted device relative to the user's head. Hence, there may for example be no need for dedicated sensors such as proximity sensors to detect when the head-mounted device is moved out of position.

A second aspect provides embodiments of a system for detecting relocation of a head-mounted device relative to a user. The system comprises processing circuitry (or one or more processors) configured to obtain images of an eye captured at a sequence of time instances by a camera of the head-mounted device. For each of the time instances, the processing circuitry is configured to estimate, using at least one image of the eye captured at that time instance, a position of a center of a corneal curvature of the eye, estimate, using at least one image of the eye captured at that time instance, a position of a center of a pupil of the eye, and determine a line through the estimated position of the center of the corneal curvature and the estimated position of the center of the pupil. The processing circuitry is configured to compute a first estimated position of a center of the eye based on the lines determined for time instances in a first time period, and to compute a second estimated position of the center of the eye based on the lines determined for time instances in a second time period. The processing circuitry is configured to detect, based on the first and second estimated positions of the center of the eye, relocation of the head-mounted device relative to the user's head.

The processing circuitry (or one or more processors) may for example be configured to perform the method as defined in any of the embodiments of the first aspect disclosed herein (in other words, in the claims, the summary, or the detailed description). The system may for example comprise one or more non-transitory computer-readable storage media (or one or more memories) storing instructions that, upon execution by the processing circuitry (or one or more processors), cause the gaze tracking system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions which, when executed by processing circuitry of a system, cause the system to:
- a) obtain images of an eye captured at a sequence of time instances by a camera of a head-mounted device;
- b) for each of the time instances:
    - estimate, using at least one image of the eye captured at that time instance, a position of a center of a corneal curvature of the eye,
    - estimate, using at least one image of the eye captured at that time instance, a position of a center of a pupil of the eye, and
    - determine a line through the estimated position of the center of the corneal curvature and the estimated position of the center of the pupil;
- c) compute a first estimated position of a center of the eye based on the lines determined for time instances in a first time period;
- d) compute a second estimated position of the center of the eye based on the lines determined for time instances in a second time period; and
- e) detect, based on the first and second estimated positions of the center of the eye, relocation of the head-mounted device relative to a user's head.

The non-transitory computer-readable storage medium may for example store instructions which, when executed by processing circuitry of a system, cause the system to perform the method as defined in any of the embodiments of the first aspect disclosed herein (in other words, in the claims, the summary, or the detailed description).

The non-transitory computer-readable storage medium may for example be provided in a computer program product. In other words, a computer program product may for example comprise a non-transitory computer-readable storage medium storing instructions which, when executed by processing circuitry of a system, cause the system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Throughout the present disclosure, the term "head-mounted display" or "HMD" refers to a display device adapted to be worn at the head of a user. In addition to the actual display optics, the HMD typically also includes other components. Such other components may for example include circuits for powering the HMD, sensors for detecting motion of the HMD, gaze tracking equipment, or a casing for protecting components of the HMD. In other words, the term "head-mounted display" or "HMD" should not necessarily be construed as only referring to the actual display optics intended to be arranged in front of an eye of the user, or in front of both eyes of the user.

Throughout the present disclosure, the term "head-mounted device" refers to a device adapted to be worn at the head of a user. A head-mounted device may for example be a head-mounted display (HMD). A head-mounted device may for example comprise a display of any type. However, there are also head-mounted devices which do not comprise a display.

Methods for detecting relocation of a head-mounted device as well as corresponding systems and storage media will be described below with reference to FIGS. 3-13. First, certain features of an eye will be described with reference to FIGS. 1-2.

Figure 1:
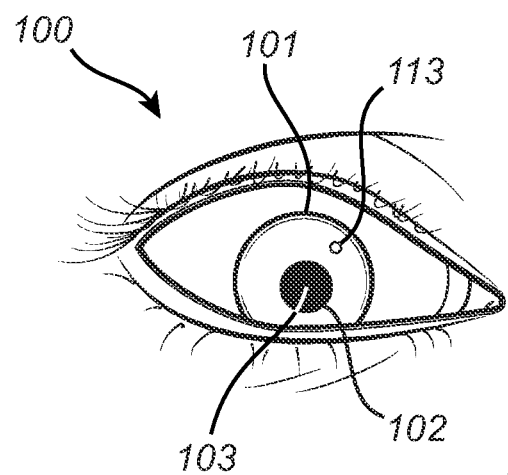
FIG. 1 is a front view of an eye.
Figure 2:
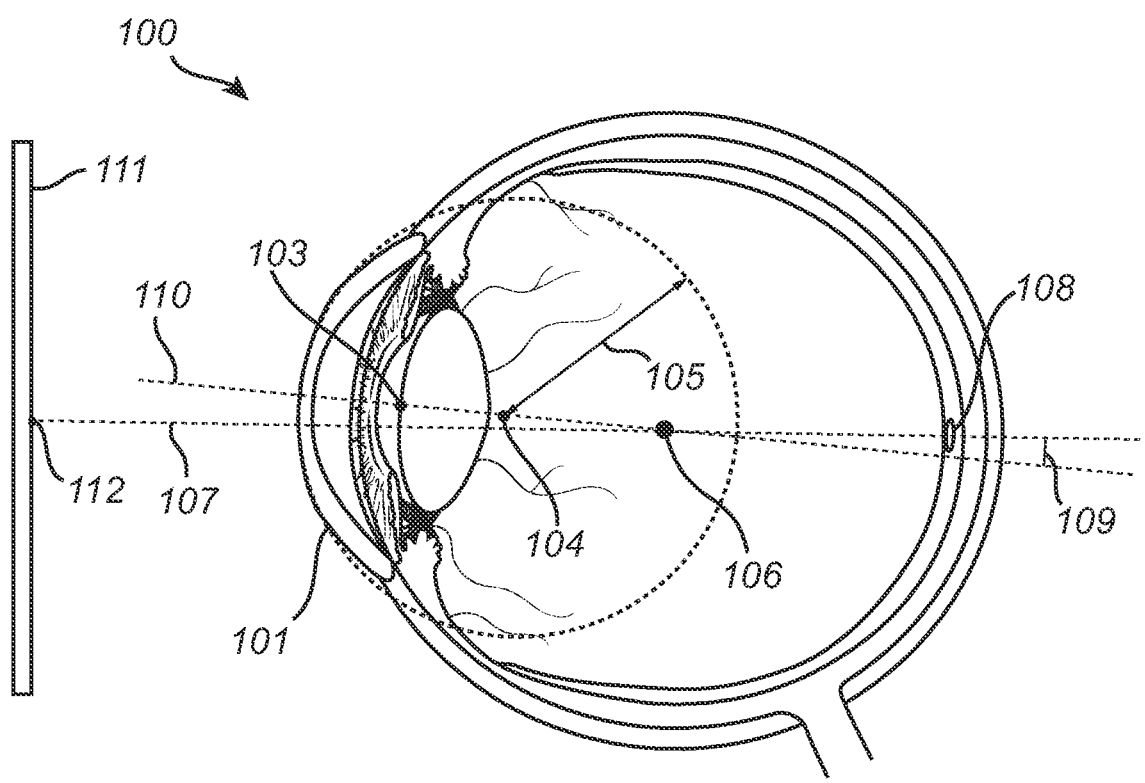
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a cornea 101 and a pupil 102 with a pupil center 103. The cornea 101 is curved and has a center of curvature 104 which is referred as the center 104 of corneal curvature, or simply the cornea center 104. The cornea 101 has a radius of curvature referred to as the radius 105 of the cornea 101, or simply the cornea radius 105. The eye 100 has a center 106 which may also be referred to as the center 106 of the eye ball, or simply the eye ball center 106. The visual axis 107 of the eye 100 passes through the center 106 of the eye 100 to the fovea 108 of the eye 100. The optical axis 110 of the eye 100 passes through the pupil center 103 and the center 106 of the eye 100. The visual axis 107 forms an angle 109 relative to the optical axis 110. The deviation or offset between the visual axis 107 and the optical axis 110 is often referred to as the fovea offset 109. In the example shown in FIG. 2, the eye 100 is looking towards a display 111, and the eye 100 is gazing at a gaze point 112 at the display 111. FIG. 1 also shows a reflection 113 of an illuminator at the cornea 101. Such a reflection 113 is also known as a glint.

Figure 3:
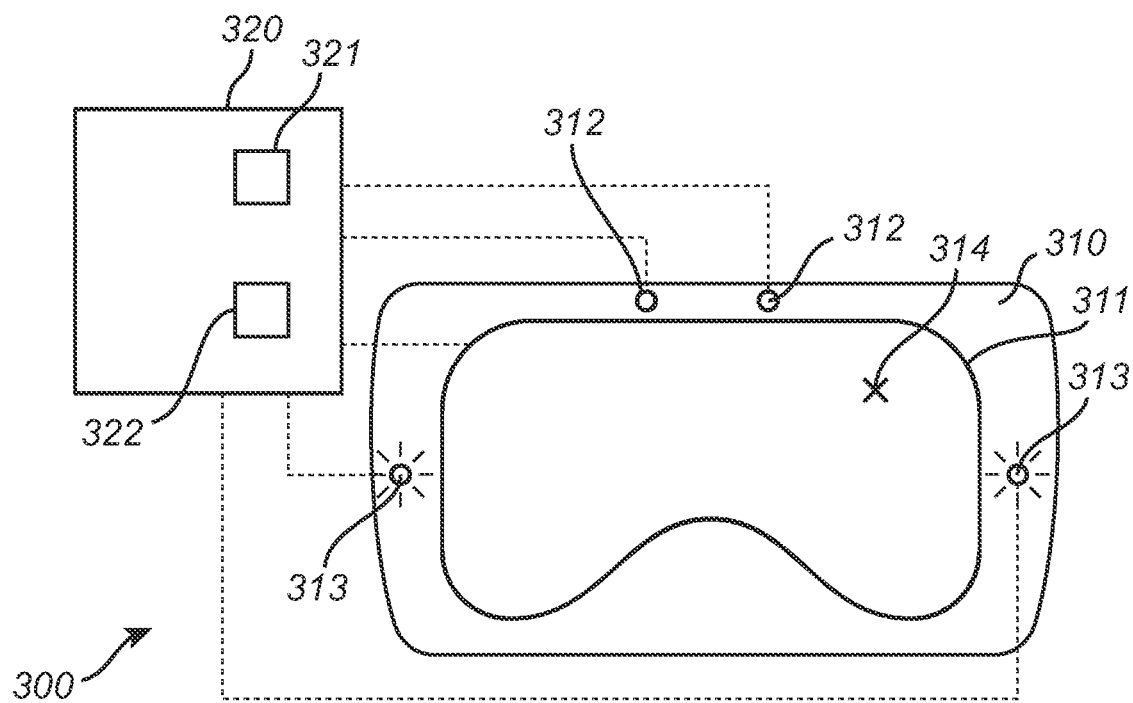
FIG. 3 is a schematic overview of a system for detecting relocation of a head-mounted device relative to a user's head, according to an embodiment.
Figure 13:
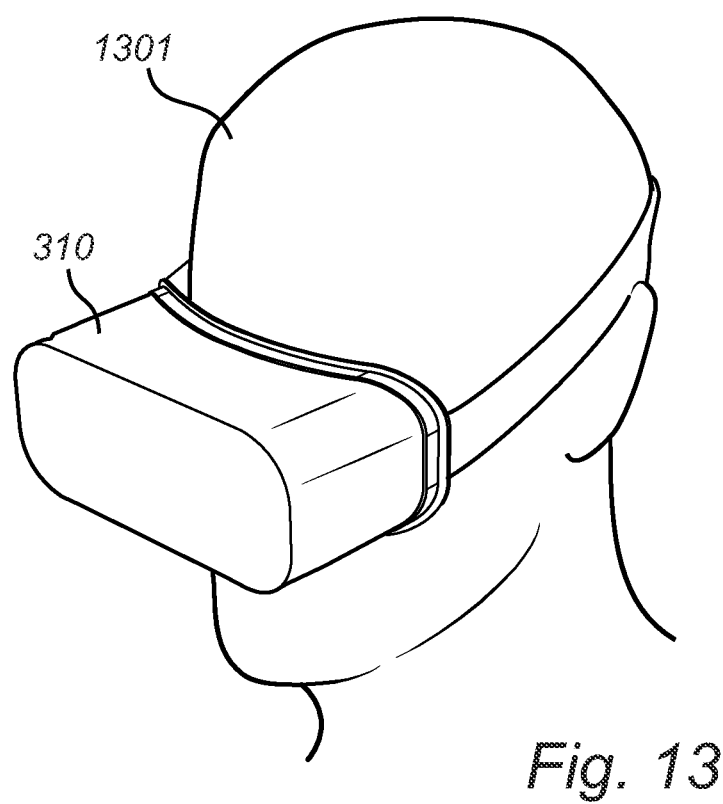
FIG. 13 shows a head-mounted device mounted at a user's head.

FIG. 3 is a schematic overview of a system 300 for detecting relocation of a head-mounted device 310 relative to a user's head, according to an embodiment. The head-mounted device 310 is a device which is adapted to be mounted (or arranged) at the head 1301 of a user, as shown in FIG. 13. The head-mounted device 310 comprises one or more displays 311. The head-mounted device may for example comprise a single display 311 which is intended to be positioned in front of the user's eyes (as show in FIG. 3), or the head-mounted device 310 may comprise separate displays which are intended to be positioned in front of the users left eye and right eye respectively. Alternatively, the head-mounted device 310 could comprise a single display adapted to be arranged in front of one of the user's eyes, so that one eye can watch the display of the head-mounted device while the other eye can watch the real world surroundings. The head-mounted device 310 may for example be head-mounted display (HMD) such as a virtual reality (VR) headset, an augmented reality (AR) headset or a mixed reality (MR) headset. The head-mounted device 310 may for example be glasses equipped with AR functionality.

The head-mounted device 310 comprises one or more cameras 312 for capturing images of the user's eyes while the user looks at the display(s) 311. The head-mounted device 310 may also comprise one or more illuminators 313 for illuminating the eyes of the user. The camera(s) 312 and illuminator(s) 313 may for example be employed for gaze tracking. The gaze tracking may for example involve estimating a gaze direction (corresponding to the visual axis 107) or estimating a gaze point 112.

The head-mounted device 310 may for example be comprised in the system 300, or may be regarded as separate from the system 300.

The system 300 comprises processing circuitry 320 configured to detect relocation of the head-mounted device 310 relative to a user's head. The processing circuitry 320 may for example also be configured to estimate a gaze direction (or gaze vector) of an eye 100 (corresponding to a direction of the visual axis 107), or a gaze point 112 of the eye 100.

The processing circuitry 320 may for example be comprised in the head-mounted device 310, or may be separate from the head-mounted device 320. The processing circuitry 320 may be communicatively connected to the head-mounted device 320, for example via a wired or wireless connection. For example, the processing circuitry 320 may be communicatively connected to the camera(s) 312, to the display 311 (for example for controlling or triggering the display 311 to show test stimulus points 314 for calibration of gaze tracking) and/or to the illuminator(s) 313.

The illuminator(s) 313 may for example be infrared or near infrared illuminators, for example in the form of light emitting diodes (LEDs). However, other types of illuminators may also be envisaged. FIG. 3 shows example illuminators 313 located at either side of the display 311, but the illuminators 313 could be located elsewhere. The head-mounted device 310 may for example comprise illuminators 313 distributed around the display 311.

The cameras 312 may for example be charged-coupled device (CCD) cameras or Complementary Metal Oxide Semiconductor (CMOS) cameras. However, other types of cameras may also be envisaged. FIG. 3 shows example cameras 312 located above the display 311, but the cameras 312 could be located elsewhere, for example below the display 311. The head-mounted device 310 may for example comprise camera 312 distribute around the display 311.

The display 311 may for example be a liquid-crystal display (LCD) or a LED display. However, other types of displays may also be envisaged. The display may 311 may for example be flat or curved. The display 311 may for example be placed in front of one of the user's eyes. In other words, separate displays may be employed for the left and right eyes. Separate equipment (such cameras 312 and illuminators 313) may for example be employed for the left and right eyes.

The processing circuitry 320 may be employed for monitoring both eyes, or there may be separate processing circuitry 320 for the left and right eyes. The system 300 may for example perform gaze tracking for the left and right eyes separately, and may then determine a combined gaze point as an average of the gaze points determined for the left and right eyes.

The processing circuitry 320 may for example comprise one or more processors 321. The processor(s) 321 may for example be application-specific integrated circuits (ASIC) configured to perform a specific method. Alternatively, the processor(s) 321 may be configured to execute instructions (for example in the form of a computer program) stored in one or more memories 322. Such a memory 322 may for example be comprised in the circuitry 320 of the system 300, or may be external to (for example located remotely from) the system 300. The memory 322 may store instructions for causing the system 300 to detect relocation of the head-mounted device 310 relative to a user's head.

It will be appreciated that the system 300 described above with reference to FIG. 3 is provided as an example, and that many other systems may be envisaged. For example, the illuminator(s) 313 and/or the camera(s) 312 need not necessarily be regarded as part of the system 300. The system 300 may for example consist only of the processing circuitry 320.

As described above with reference to FIG. 2, the optical axis 110 of the eye 100 passes through the center 103 of the pupil 102 and the center 106 of the eye ball. If the center 106 of the eye 100 stays in a fixed position, but the eye 100 gazes in different directions at different time instances (or points in time), the optical axes for these time instances should intersect at the center 106 of the eye 100. This situation is illustrated in FIG. 4.

Figure 4:
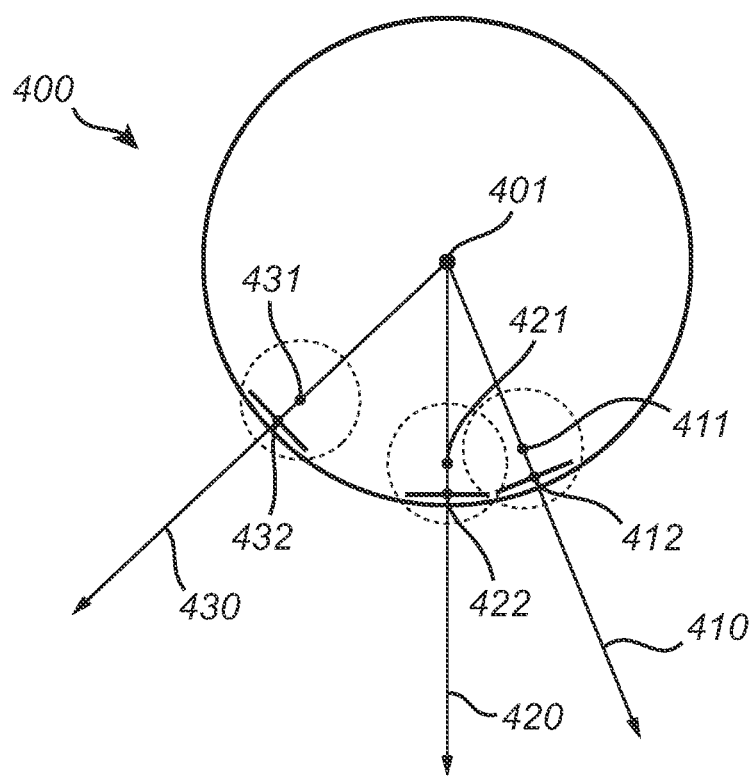
FIG. 4 shows optical axes intersecting at the center of an eye.

FIG. 4 shows optical axes 410, 420 and 430 intersecting at the center 401 of an eye 400. At a first time instance, the eye 400 is directed along a first optical axis 410 which passes through a first cornea center position 411 (or a first position 411 of the center of corneal curvature) and a first pupil center position 412 (or a first position 412 of the pupil center). At a second time instance, the eye 400 is directed along a second optical axis 420 which passes through a second cornea center position 421 and a second pupil center position 422. At a third time instance, the eye 400 is directed along a third optical axis 430 which passes through a third cornea center position 431 and a third pupil center position 432. The optical axes 410, 420 and 430 all intersect at the same point 401 at the center of the eye 400. If, on the other hand, the center 401 of the eye 400 moves relative to an observer (for example relative to a camera capturing images of the eye 400), then optical axes for different time instances will appear not to intersect at the same point. Such a situation is illustrated in FIG. 5.

Figure 5:
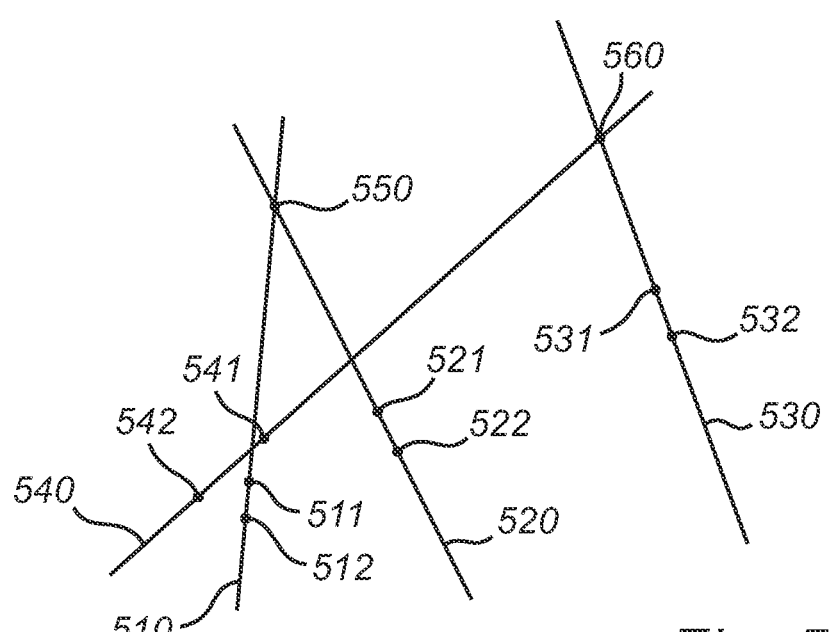
FIG. 5 shows optical axes intersecting at different locations.
Figure 6:
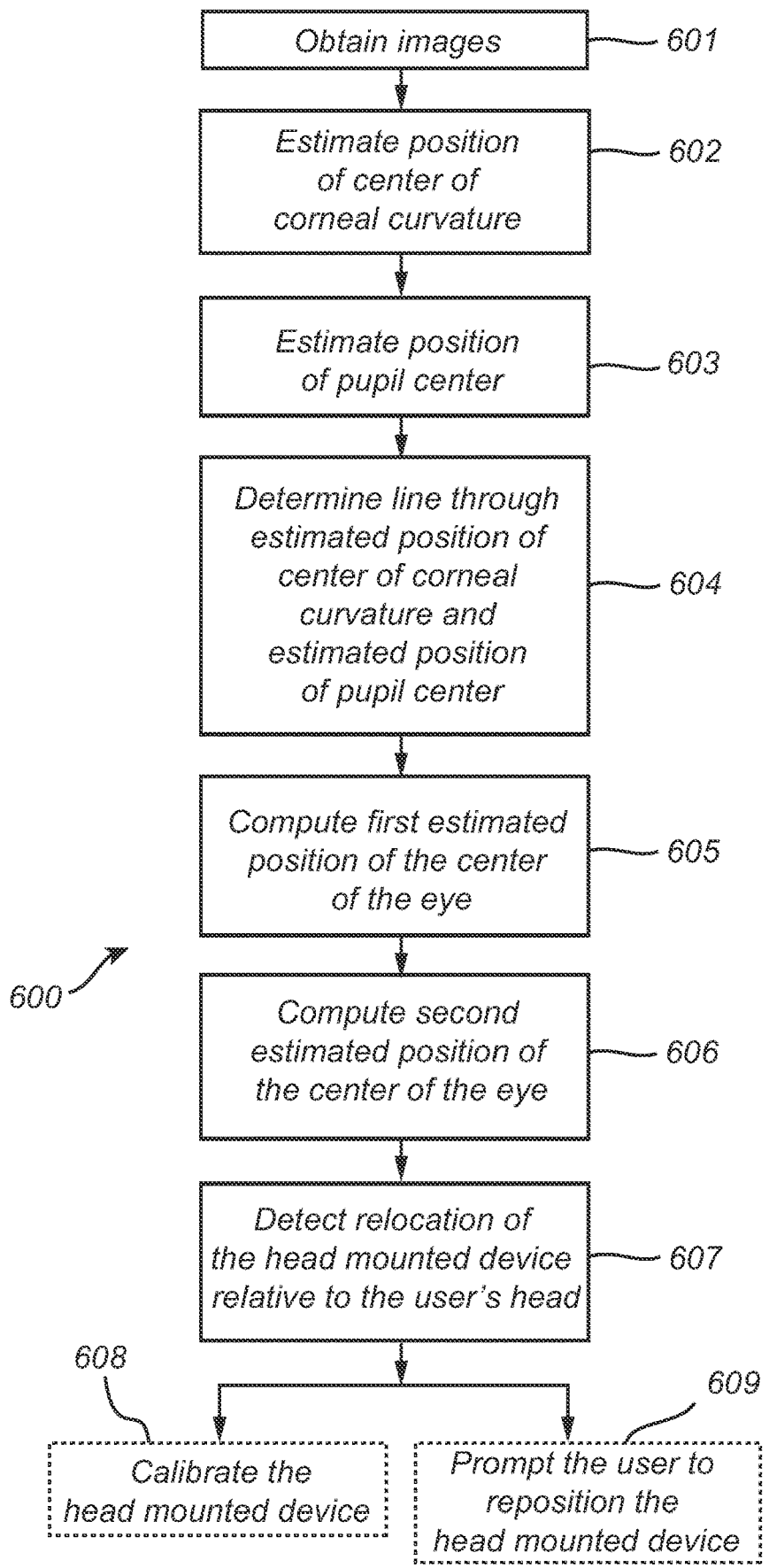
FIG. 6 is a flow chart of a method for detecting relocation of a head-mounted device relative to a user's head, according to an embodiment.

FIG. 5 shows optical axes 510, 520, 530 and 540 intersecting at different points as perceived in images captured by a camera 312 of a head-mounted device 310. This may indicate that the camera 312 (and thereby also the head-mounted device 310) has been relocated relative to the head of the user. FIG. 6 is a flow chart of a method 600 for detecting relocation of a head-mounted device 310 relative to a user's head, according to an embodiment. The method 600 will be described with reference to FIGS. 2, 5 and 6.

The method 600 comprises obtaining 601 (or receiving) images of an eye 100 of the user captured at a sequence of time instances (or points in time) by a camera 312 of the head-mounted device 310. The images may for example be obtained in the form of snap shots, or as part of a video sequence. The images may for example be received from the camera 312, either directly from the camera 312 or indirectly from the camera 312 (for example via one or more other components of the system 300).

The camera 312 may be arranged at a fixed position relative to the display 311 of the head-mounted device 310. The camera 312 may for example be mounted at the head-mounted device 310 or may be integrated in the head-mounted device 310.

For each of the time instances, the method 600 comprises estimating 602 a position of a center 104 of a corneal curvature of the eye 100 using at least one image of the eye 100 captured at that time instance, and estimating 603 a position of a center 103 of a pupil 102 of the eye 100 using at least one image of the eye 100 captured at that time instance. In the example shown in FIG. 5, images have been captured at four time instances, so positions 511, 521, 531 and 541 of the center 104 of corneal curvature and positions 512, 522, 532, 542 of the pupil center 103 are estimated for these points in time. It will be appreciated that the positions determined at the step 602 are positions relative to the camera 312 (or relative to the head-mounted device 310), and that these relative positions would not change if the user's head changes position and/or orientation in three-dimensional space (unless the head-mounted device 310 slips).

The method 600 comprises determining 604 (or forming) a line (or optical axis) through the estimated position of the center 104 of the corneal curvature and the estimated position of the center 103 of the pupil 102 for each of time instances. Hence, in the example shown in FIG. 5, a first line 510 (or optical axis) is determined through the first position 511 of the center 104 of corneal curvature and through the first position 512 of the pupil center 103. Similarly, a second line 520, a third line 530 and a fourth line 540 are determined for the second, third and fourth time instances respectively.

The method 600 comprises computing 605 (or determining) a first estimated position 550 of a center 106 of the eye 100 based on the lines determined for time instances in a first time period. In the example shown in FIG. 5, the first time period comprises the first and second time instances, so the first estimated position 550 of a center 106 of the eye 100 is computed based on the first line 510 and the second line 520. In the example shown in FIG. 5, the first estimated position 550 is simply the intersection of the first line 510 and the second line 520. If, on the other hand, the first estimated position were to be estimated based on more than two lines, these lines would not necessarily intersect all at the same point. In such a situation, the first estimated position may be computed as an approximate intersection of the lines. An example implementation of how to compute such an approximate intersection is described below with reference to FIG. 7. Note also that two lines need not necessary intersect in three-dimensional space. Hence, even if only two lines are to be employed for computing the first esti-mated position of the center 106 of the eye 100, it may be necessary to compute (or determine) some kind of approximate intersection rather than an actual intersection of these lines.

The method 600 comprises computing 606 (or determining) a second estimated position 560 of the center 106 of the eye 100 based on the lines determined for time instances in a second time period. In the example shown in FIG. 5, the second time period comprises the third and fourth time instances, so the second estimated position 560 of the center 106 of the eye 100 is computed based on the third line 530 and the fourth line 540. In the example shown in FIG. 5, the second estimated position 560 is simply the intersection of the third line 530 and the fourth line 540. If, on the other hand, the second estimated position were to be estimated based on more than two lines, these lines would not necessarily intersect all at the same point. In such a situation, the second estimated position may be computed as an approximate intersection of the lines. An example implementation of how to compute such an approximate intersection is described below with reference to FIG. 8. Note also that two lines need not necessary intersect in three-dimensional space. Hence, even if only two lines are to be employed for computing the second estimated position of the center 106 of the eye 100, it may be necessary to compute (or determine) some kind of approximate intersection rather than an actual intersection of these lines.

It will be appreciated that the estimated positions computed at the steps 605 and 606 are positions relative to the camera 312 (or relative to the head-mounted device 310), and that these relative positions would not change if the user's head changes position and/or orientation in three-dimensional space (unless the head-mounted device 310 slips).

The method 600 comprises detecting 607, based on the first and second estimated positions of the center 106 of the eye 100, relocation (or repositioning) of the head-mounted device 310 relative to the user's head. In the example shown in FIG. 5, the first estimated position 550 of the center 106 of the eye 100 and the second estimated position 560 of the center 106 of the eye 100 are located at a distance from each other. This may indicate that the camera 312 (and thereby the head-mounted device 310) has been relocated (or moved) relative to the user's head.

In theory, the first estimated position 550 of the center 106 of the eye 100 and the second estimated position 560 of the center 106 of the eye 100 should coincide unless the head-mounted device 310 has moved relative to the user's head. However, these estimated positions may typically deviate somewhat due to various types of noise and/or approximations in the computations, even if the head-mounted device 310 remains at its original position. Hence, according to some embodiments, the step 607 of detecting relocation of the head-mounted device 310 relative to the user's head may involve checking whether a deviation between the first and second estimated positions 550 and 560 of the center 106 of the eye 100 exceeds a threshold. If the deviation is above the threshold, it may be concluded that the head-mounted device 310 has probably been relocated. If the deviation is below the threshold, it may be concluded that the head-mounted device 310 has probably not been relocated. The threshold may for example be set to 1 mm, 2 mm, 3 mm, 4 mm, 5 mm, or 1 cm.

The lines 510 and 520 employed to obtain the first estimated position 550 of the center of the eye may for example correspond to when the head-mounted device remains in its intended position relative to the user's head, so that the optical axes of the eye all intersect at the same point, as illustrated by the optical axes 410, 420 and 430 in FIG. 4. The lines 530 and 540 employed to obtain the second estimated position 560 of the center of the eye may for example correspond to when the head-mounted device has slipped relative to the user's head, so that the optical axes of the eye appear to intersect at a new position.

The method 600 has been described above with reference to FIG. 5. It will be appreciated that the collection positions and lines shown in FIG. 5 are merely intended as an example. For example, the first estimated position of the center 106 of the eye 100 could be computed as an intersection of a first line (determined via an image captured at a first time instance) and a second line (determined via an image captured at a second time instance), and the second estimated position of the center of the eye could be computed as an intersection of the second line and a third line (determined via an image captured at a third time instance). In other words, relocation of the head-mounted device 310 could for example be detected using images captured at only three different time instances.

If it is detected that the head-mounted device 310 has been relocated relative to the user's head, some type of corrective action may be needed to restore performance of the head-mounted device 310. For example, the HMD 310 may have been calibrated for operation at a certain position relative to the user's head. When relocation of the head-mounted device 310 is detected, the head-mounted device 310 may therefore be recalibrated for operation at the new position. Hence, the method 600 may optionally comprise providing 608 signaling for calibration of the head-mounted device 310 in response to detecting relocation of the head-mounted device 310 relative to the user's head. The signaling may for example control (or trigger) the head-mounted device 310 to perform calibration, or may control (or trigger) some type of calibration equipment to perform calibration of the head-mounted device 310.

Another type of corrective action that may be performed to restore performance of the head-mounted device 310 is to reposition the head-mounted device 310 at its original position. Hence, the method 600 may optionally comprise providing 609 signaling for prompting the user to reposition the head-mounted device 310 in response to detecting relocation of the head-mounted device 310 relative to the user's head. The signaling may for example control the display 312 of the head-mounted device 310 to provide a visual instruction (for example in the form of a text message) to the user to arrange the head-mounted device 310 at its proper position. The signaling may for example control the head-mounted device 310 (or some other device) to provide an audio message instructing the user to arrange the head-mounted device 310 at its proper position.

As described above with reference to FIGS. 5-6, more than two lines in a plane do not necessarily intersect at the same point, and two lines in three-dimensional space do not necessarily intersect at all. As described below with reference to FIGS. 7-8, an approximate intersection point may be employed if no true intersection point can be found.

Figure 7:
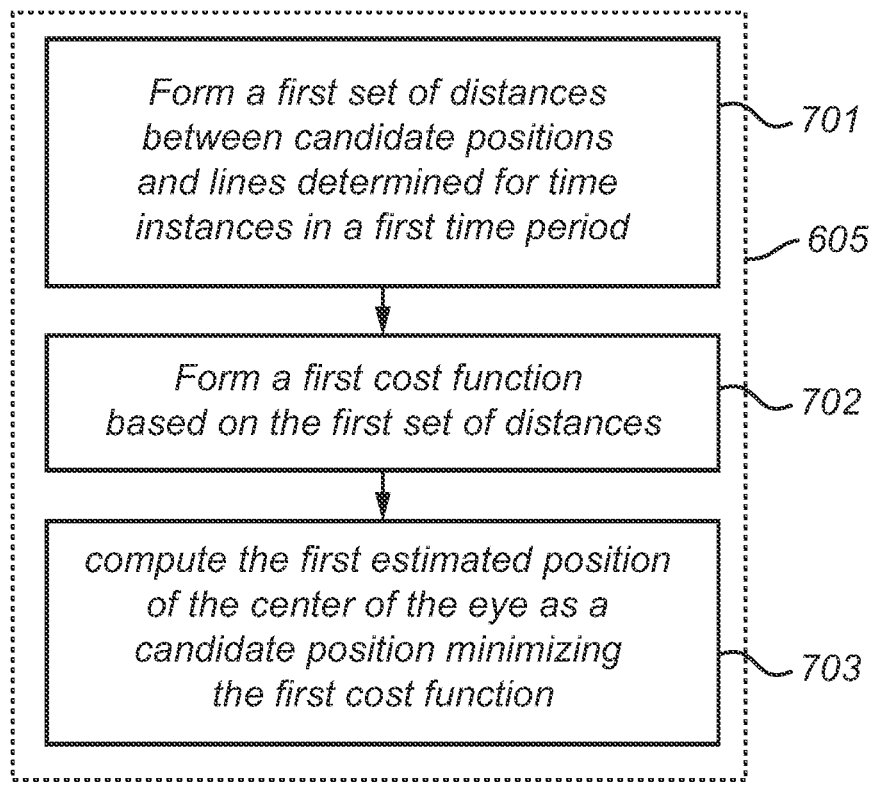
FIGS. 7-8 are flow charts of example implementations of how to compute estimated positions of a center of an eye in the method from FIG. 6, according to some embodiments.

FIG. 7 is a flow chart of an example implementation of how to compute 605 the first estimated position 550 of a center 106 of an eye 100 in the method 600 described above with reference to FIG. 6, according to an embodiment. In the present embodiment, the step 605 of computing the first estimated position 550 of the center 106 of the eye 100 comprises:

forming 701 a first set of distances between candidate positions and the lines 520 and 530 determined for time instances in the first time period, forming 702 a first cost function based on the first set of distances, and computing 703 the first estimated position 550 of the center 106 of the eye 100 as a candidate position minimizing the first cost function.

The distances employed by the cost function may for example be Euclidean distances, but other types of distances (or metrics) could also be employed. The cost function may for example be a sum of squares of the distances from a candidate position to the lines, but other cost functions could also be employed. The minimization may for example be performed among candidate positions in a plane, or among candidate positions in three-dimensional space. The first estimated position 550 of the center 106 of the eye 100 may for example be a least squares estimate among the candidate positions.

Figure 8:
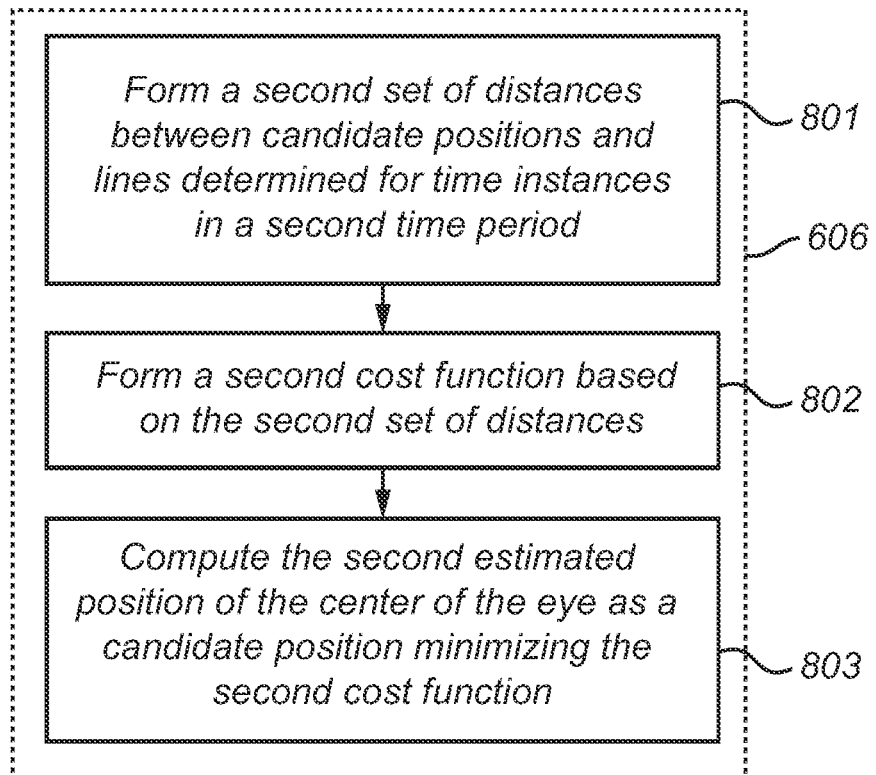

FIG. 8 is a flow chart of an example implementation of how to compute 606 the second estimated position 560 of a center 106 of an eye 100 in the method 600 described above with reference to FIG. 6, according to an embodiment. In the present embodiment, the step 606 of computing the second estimated position 560 of the center 106 of the eye 100 comprises:

forming 801 a second set of distances between candidate positions and the lines 530 and 540 determined for time instances in the second time period, forming 802 a second cost function based on the second set of distances, and computing 803 the second estimated position 560 of the center 106 of the eye 100 as a candidate position minimizing the second cost function.

The distances employed by the second cost function may for example be Euclidean distances, but other types of distances (or metrics) could also be employed. The cost function may for example be a sum of squares of the distances from a candidate position to the lines, but other cost functions could also be employed. The minimization may for example be performed among candidate positions in a plane, or among candidate positions in three-dimensional space. The second estimated position 560 of the center 106 of the eye 100 may for example be a least squares estimate among the candidate positions.

According to some embodiments, the positions of the center 104 of the corneal curvature, the center 103 of the pupil 102, and the center 106 of the eye 100 estimated in the method 600 described above with reference to FIGS. 5-6 are computed as positions in a three-dimensional (3D) space.

3D positions of the center 104 of corneal curvature may for example be estimated via pupil center corneal reflection (PCCR) using a three-dimensional model of the eye 100. Hence, according to some embodiments, at least some of the images of the eye 100 are captured while the eye 100 is illuminated by an illuminator 313 (or multiple illuminators 313). For a time instance, the position of the center 104 of the corneal curvature is estimated based on a position of a reflection 113 of the illuminator 313 (or based on positions of reflections of multiple illuminators) at the cornea 101 of the eye 100 in an image captured at that time instance. Example equations for how to compute the estimated positions of the center 104 of corneal curvature may for example be found in the paper "*General Theory of Remote Gaze Estimation Using the Pupil Center and Corneal Reflections*" by E. D. Guestrin et al. in IEEE Transactions on biomedical engineering, vol. 53, no. 6, June 2006 (which is incorporated herein by reference in its entirety), where the center 104 of corneal curvature is denoted by "c".

3D positions of the pupil center 103 may for example be estimated via PCCR. Hence, according to some embodiments at least some of the images of the eye 100 are captured while the eye 100 is illuminated by an illuminator 313 (or multiple illuminators). For a time instance, the position of the center 103 of the pupil 102 is estimated based on a position of the center 103 of the pupil 102 in an image of the eye 100 captured at that time instance and based on a reflection 113 of the illuminator 313 (or based on positions of reflections of multiple illuminators) at the cornea 101 of the eye 100 in an image captured at that time instance. Example equations for how to compute the estimated positions of the pupil center 103 may for example be found in the paper "*General Theory of Remote Gaze Estimation Using the Pupil Center and Corneal Reflections*" by E. D. Guestrin et al. in IEEE Transactions on biomedical engineering, vol. 53, no. 6, June 2006 (which is incorporated herein by reference in its entirety), where the pupil center 103 is denoted by "p".

Detection 607 of relocation of the head-mounted device 310 relative to the user's head may be performed using estimated 3D positions of the center 106 of the eye 100. However, 3D motion of the head-mounted device 310 has many degrees of freedom. The head-mounted device 310 could for example be rotated around three different axes, and could be translated along three different axes. Such translations and rotations may be difficult to distinguish from noise in a reliable way. Hence, if the estimated position of the center 106 of the eye 100 changes or fluctuates somewhat over time, it may be difficult to determine whether this is due to noise, or whether it is really due to a relocation of the head-mounted device 310 relative to the user's head. A projection down to a two-dimensional (2D) setting may therefore be useful.

Figure 9:
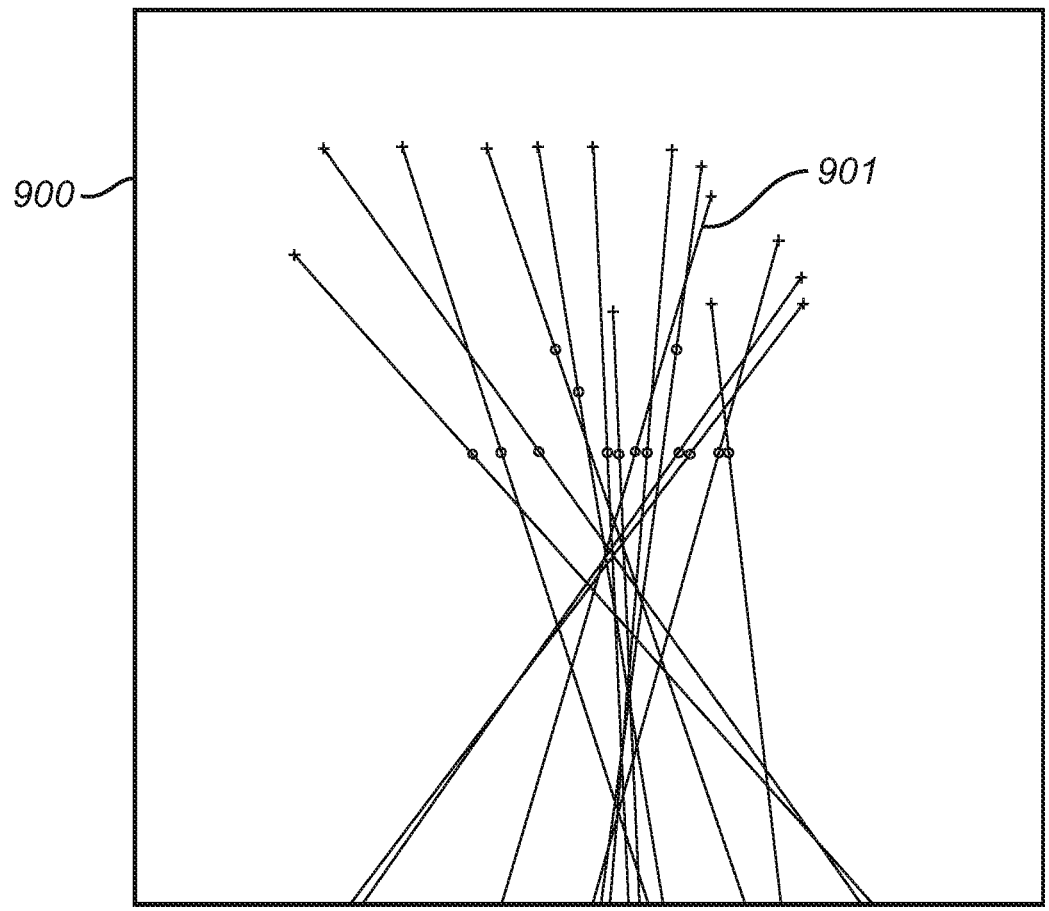
FIG. 9 shows a projection of optical axes in a plane, according to an embodiment.

Hence, according to some embodiments, the first and second estimated positions of the center 106 of the eye 100 are computed as positions in a predefined plane. Such an embodiment is illustrated in FIG. 9 which shows a projection, in a plane 900, of lines 901 (or optical axes) determined in the method 600 described above with reference to FIG. 6. Each of the optical axes 901 passes through an estimated position of the center 104 of corneal curvature (indicated by "o" in FIG. 9) and an estimated position of the pupil center 103 (indicated by "+" in FIG. 9). The optical axes 901 do not all intersect at the same point even in the 2D representation in the plane 900, but the behavior of the optical axes 901 (and their respective intersections) may be easier to analyze in the plane 900 than in a 3D representation.

The plane 900 may for example be predefined (or predetermined) in the sense that is defined (or determined) prior to computing the estimated positions of the center 106 of eye 100. The plane 900 may for example have a fixed orientation relative to the head-mounted device 310 and/or relative to the camera 312 capturing the images. The plane 900 may for example be parallel to a plane along which the head-mounted device 310 extends, or along which the display 311 of the head-mounted device 310 extends. If the head-mounted device 310 slips relative to the user's head, the head-mounted device 310 will then typically slip in a direction more or less parallel to the plane 900. From the perspective of the camera 312, it will appear as though the eyes of the user move along a direction in the plane 900. Slippage (or relocation) of the head-mounted device 310 relative to the user's head may therefore be easily detected in the two-dimensional representation provided in the plane 900. Using a two-dimensional representation to detect slippage of the head-mounted device 310 may for example be more reliable and/or computationally less demanding than using a 3D representation to detect slippage of the head-mounted device 310.

If a 2D-representation (like the one described above with reference to FIG. 9) is to be employed for detecting relocation of the head-mounted device 310, there is no need to estimate 3D positions of the pupil center 103. Hence, rather than employing PCCR to estimate 3D positions for the pupil center 103, 2D positions for the pupil center 103 may be estimated in the images captured by the camera 312, for example using image analysis. The edge (or at least part of the edge) of the pupil 102 may for example be detected in an image, and the position of the pupil center 103 may be estimated based on the detected pupil edge. In some images, the edge of the pupil 102 may be difficult to detect. This may for example happen if the iris is so dark that it is of similar color as the pupil 102. The edge (or at least part of the edge) of the iris may then be detected in the image, and the position of the pupil center 103 may be estimated based on the detected edge of the iris. The images captured by the camera 312 may for example be digital images. The position of the pupil center 103 in an image captured by the camera 312 may be estimated as one or more pixels in the image.

A 2D position of the center 104 of corneal curvature may be difficult to estimate directly in the images captured by the camera 312. PCCR may therefore be employed to estimate a 3D position of the center 104 of corneal curvature. This 3D position may then be projected down to a 2D position.

Hence, in a first example scenario, 2D positions of the center 104 of corneal curvature and the pupil center 103 are estimated in a plane 900, the optical axes 901 are formed in the plane 900, and the estimated positions of the center 106 of the eye 100 are computed in the plane 900 based on the optical axes 901.

In a second scenario, the positions of the center 104 of the corneal curvature and the positions of the center 103 of the pupil 102 are estimated as positions in a three-dimensional space, and the optical axes (or lines) are determined in the three-dimensional space. In this scenario, the optical axes are then projected in the plane 900 to form optical axes 901 in the plane 900. The estimated positions of the center 106 of the eye 100 are then computed in the pane 900 based on these projections of the optical axes in the plane 900.

In a third scenario, the positions of the center 104 of the corneal curvature and the positions of the center 103 of the pupil 102 are estimated as positions in a three-dimensional space, the lines (or optical axes) are determined in the three-dimensional space, the estimated positions of the center 106 of the eye 100 are computed as positions in the three-dimensional space, and are then projected in the plane 900 to obtain 2D positions in the plane 900.

The plane 900 described above with reference to FIG. 9 may for example be a plane of an image captured by the camera 312. Hence, according to some embodiments, the first and second estimated positions of the center 106 of the eye 100 are computed as positions in a plane of an image captured by the camera 312. In other words, the estimated positions of the center 106 of the eye 100 computed in the method 600 described above with reference to FIG. 6 may be computed as positions in a plane represented by an image captured by the camera 312. This plane may for example be referred to as an image plane. Such an embodiment will be described below with reference to FIGS. 10-11.

Figure 10:
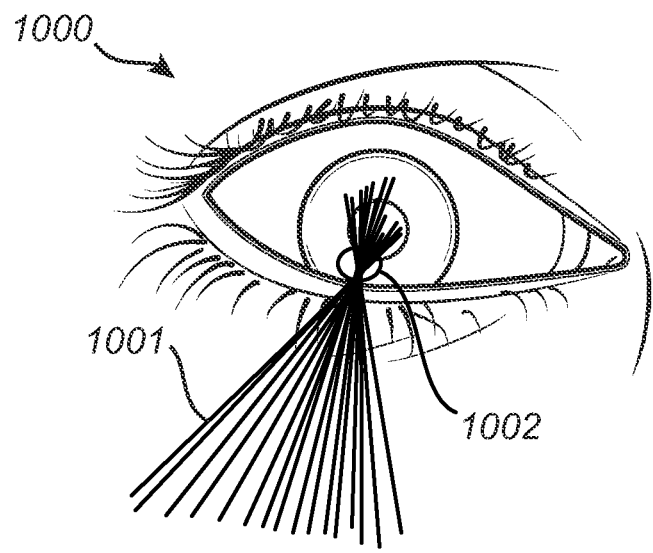
FIGS. 10-11 show estimated optical axes in images of an eye, according to an embodiment.
Figure 11:
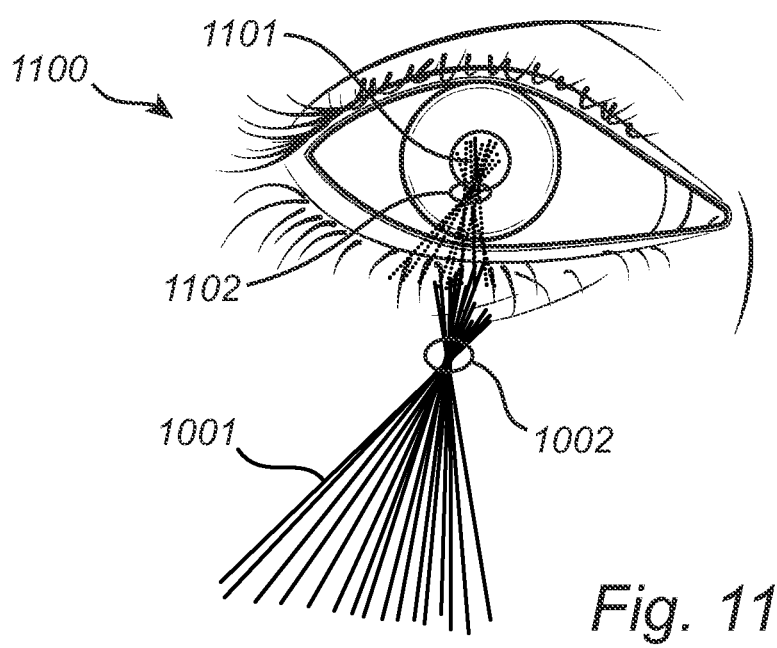

FIGS. 10-11 show estimated optical axes in images of an eye, according to an embodiment. FIG. 10 shows a first image 1000 of an eye, and optical axes 1001 estimated for time instances in a first time period. These optical axes 1001 indicate that the center of the eye may be located in a first region 1002, since that is where an approximate intersection of the optical axes is located. FIG. 11 shows a second image 1100 of the eye. FIG. 11 shows the optical axes 1001 from FIG. 10, and also new optical axes 1101 estimated for time instances in a second time period after the first time period. These new optical axes 1101 indicate that the center 106 of the eye 100 may be located in a second region 1102, since there is where an approximate intersection of the new optical axes 1101 is located. The center 106 of the eye 100 appears to have moved relative to the camera between the first time period (corresponding to the first region 1002) and the second time period (corresponding to the second region 1102). This is an indication of drift (or slippage) of a head-mounted device.

Figure 12:
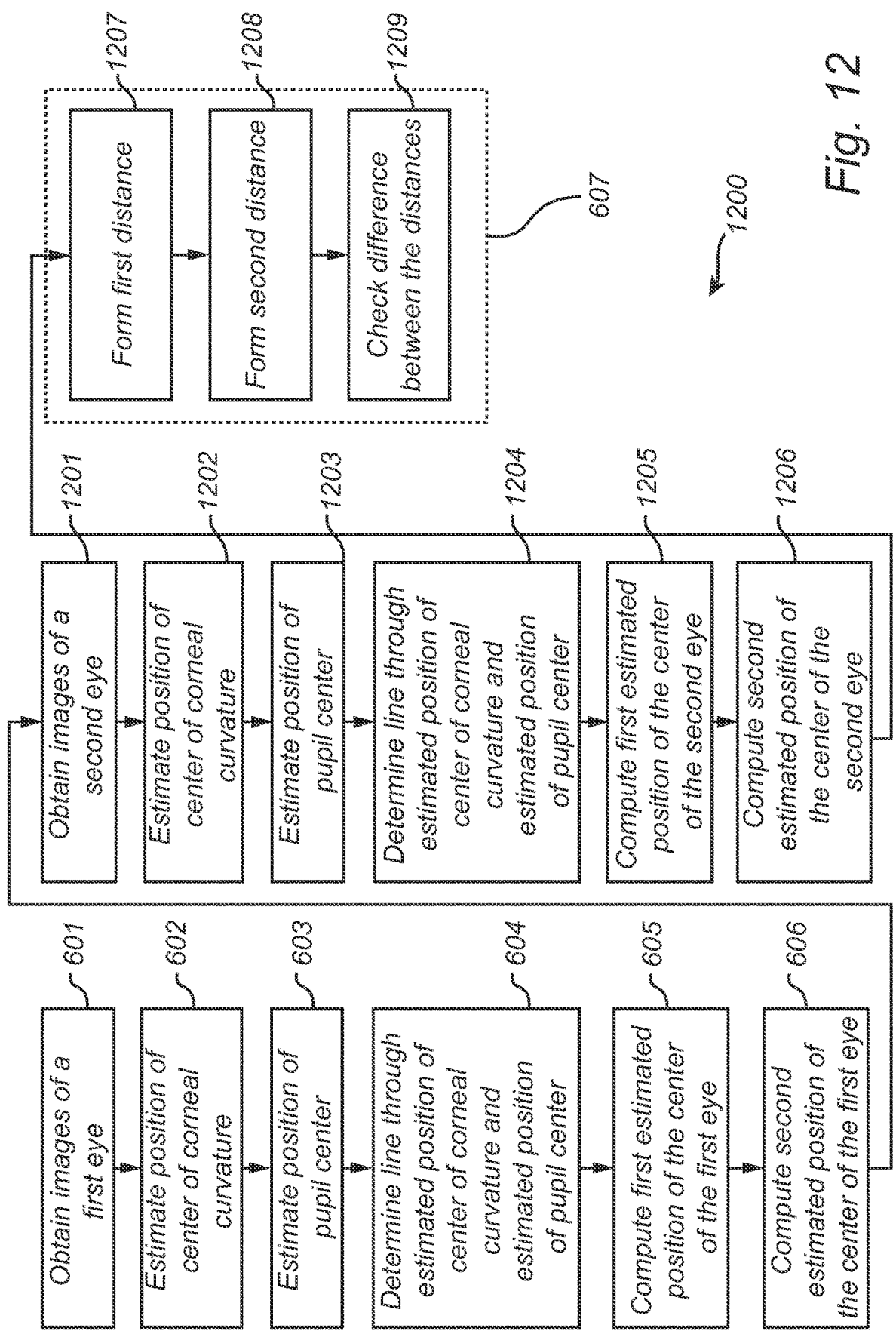
FIG. 12 is a flow chart of a method which uses both eyes of a user for detecting relocation of a head-mounted device relative to the user's head, according to an embodiment.

FIG. 12 is a flow chart of a method 1200 for detecting relocation of a head-mounted device 310 relative to a user's head using both eyes of the user, according to an embodiment. The method 1200 comprises the initial six steps 601-606 of the method 600 described above with reference to FIG. 6. The description of those steps will not be repeated here. The method 1200 also comprises analog steps 1201-1206 for a second eye of the user. In other words, the method 1200 comprises:

obtaining 1201 images of a second eye of the user captured at the sequence of time instances by a camera 132 of the head-mounted device 310;

for each of the time instances:
estimating 1202, using at least one image of the second eye captured at that time instance, a position of a center of a corneal curvature of the second eye,
estimating 1203, using at least one image of the second eye captured at that time instance, a position of a center of a pupil of the second eye, and
determining 1204 a line through the estimated position of the center of the corneal curvature of the second eye and the estimated position of the center of the pupil of the second eye;

computing 1205 a first estimated position of a center of the second eye based on the lines determined for the second eye for time instances in the first time period; and computing 1206 a second estimated position of the center of the second eye based on lines determined for the second eye for time instances in the second time period.

Similarly to the method 600 described above with reference to FIG. 6, the method 1200 comprises the step of detecting 607 relocation of the head-mounted device 310 relative to the user's head, but in the present method 1200, this step 607 is based on the first and second estimated positions of the center of the first eye and the first and second estimated positions of the center of the second eye.

Use of both eyes to detect relocation of the head-mounted device 310 may make the detection more reliable than if only eye was to be employed for the detection. In some cases, head-mounted device 310 slippage may for example be more easily detected for one eye than for the other eye. Another advantage of using both eyes for detecting head-mounted device 310 slippage is that potential head-mounted device 310 slippage detected for the respective eyes may be compared to check that the slippages detected for the respective eyes are actually compatible with each other. If the slippages are not compatible with each other, this may indicate that some unexpected event has occurred (such as an error or malfunction of the slippage detection, or that the user has removed the head-mounted device 310), or that there is too much noise in the images captured by the camera 312. One thing that could be checked is that the distance between the eyes (which is also referred to as interocular distance) is preserved also after a potential relocation of the head-mounted device 310. Hence, the step 607 of detecting relocation of the head-mounted device 310 relative to the user's head may optionally comprise:

forming 1207 (or computing) a first distance between the first estimated position of the center of the first eye and the first estimated position of the center of the second eye;

forming 1208 (or computing) a second distance between the second estimated position of the center of the first eye and the second estimated position of the center of the second eye; and checking 1209 that a difference between the first and second distances is below a threshold.

In other words, a first interocular distance $$d_1 = \sqrt{(e_{L1} - e_{R1})^T (e_{L1} - e_{R1})}$$

is computed for the first estimated position $e_{L1}$ of the center of the left eye and the first estimated position $e_{R1}$ of the center of the right eye, and a second interocular distance $$d_2 = \sqrt{(e_{L2} - e_{R2})^T (e_{L2} - e_{R2})}$$

is computed for the second estimated position $e_{L2}$ of the center of the left eye and the second estimated position $e_{R2}$ of the center of the right eye.

If the difference between the first and second interocular distances $d_1$ and $d_2$ is below a threshold, a potential relocation of the head-mounted device 310 indicated by a deviation between the positions $e_{R1}$ and $e_{R2}$, and/or by a deviation between the positions $e_{L1}$ and $e_{L2}$ may indeed be a relocation of the head-mounted device 310 since the interocular distance seems to be at least approximately preserved. The threshold may for example be set to 1 mm, 2 mm, 3 mm, 4 mm, 5 mm, or 1 cm.

If, on the other hand, the difference between the first and second interocular distances $d_1$ and $d_2$ exceeds the threshold, this may indicate that some unexpected event has occurred (such as an error or malfunction of the slippage detection, or that the user has removed the head-mounted device 310), or that there is too much noise in the images captured by the camera 312. In this situation, a warning or error message may be signaled, instead of signaling that a slippage of the head-mounted device 310 has occurred.

The methods described above with reference to FIGS. 5-12 represent a first aspect of the present disclosure. The system 300 described above with reference to FIGS. 3 and 13 represents a second aspect of the present disclosure. The system 300 (or the processing circuitry 320 of the system 300) may for example be configured to perform the method of any of the embodiments of the first aspect described above. The system 300 may for example be configured to perform the method 600 described above with reference to FIG. 6 or the method 1200 described above with reference to FIG. 12.

According to an embodiment, the system 300 comprising processing circuitry 320 configured to:

a) obtain images of an eye captured at a sequence of time instances by a camera of the head-mounted device;

b) for each of the time instances:
estimate, using at least one image of the eye captured at that time instance, a position of a center of a corneal curvature of the eye, estimate, using at least one image of the eye captured at that time instance, a position of a center of a pupil of the eye, and determine a line through the estimated position of the center of the corneal curvature and the estimated position of the center of the pupil;

c) compute a first estimated position of a center of the eye based on the lines determined for time instances in a first time period;

d) compute a second estimated position of the center of the eye based on the lines determined for time instances in a second time period; and e) detect, based on the first and second estimated positions of the center of the eye, relocation of the head-mounted device relative to the user's head.

As described above with reference to FIG. 3, the system 300 need not necessarily comprise all the elements shown in FIG. 3. The system 300 may for example be a gaze tracking system.

A third aspect of the present disclosure is represented by embodiments of a non-transitory computer-readable storage medium 322 storing instructions which, when executed by processing circuitry 320 of the system 300, cause the system 300 to perform the method of any of the embodiments of the first aspect described above (such as the method 600 described above with reference to FIG. 6, or the method 1200 described above with reference to FIG. 12).

According to an embodiment, the non-transitory computer-readable storage medium 322 stores instructions which, when executed by processing circuitry 320 of the system 300, cause the system 300 to:

a) obtain images of an eye captured at a sequence of time instances by a camera of the head-mounted device;

b) for each of the time instances:
estimate, using at least one image of the eye captured at that time instance, a position of a center of a corneal curvature of the eye,
estimate, using at least one image of the eye captured at that time instance, a position of a center of a pupil of the eye, and
determine a line through the estimated position of the center of the corneal curvature and the estimated position of the center of the pupil;

c) compute a first estimated position of a center of the eye based on the lines determined for time instances in a first time period;

d) compute a second estimated position of the center of the eye based on the lines determined for time instances in a second time period; and e) detect, based on the first and second estimated positions of the center of the eye, relocation of the head-mounted device relative to the user's head.

As described above with reference to FIG. 3, the storage medium 322 need not necessarily be comprised in the system 300.

The person skilled in the art realizes that the present invention is by no means limited to the preferred embodiments described above. On the contrary, many modifications and variations are possible within the scope of the appended claims. For example, the embodiments described above with reference to FIGS. 1-13 may be combined to form further embodiments. Further, it will be appreciated that the system 300 shown in FIG. 300 is merely intended as an example, and that other systems may also perform the methods described above with reference to FIGS. 5-12. It will also be appreciated that the method steps described with reference to FIGS. 6, 7, 8 and 12 need not necessarily be performed in the specific order shown in these figures.

It will be appreciated that processing circuitry 320 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 322 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method for detecting relocation of a head-mounted device relative to a user's head, the method comprising:
obtaining images of an eye captured at a sequence of time instances by a camera of the head-mounted device;
for each of the time instances:
estimating, using at least one image of the eye captured at that time instance, a position of a center of a corneal curvature of the eye,
estimating, using at least one image of the eye captured at that time instance, a position of a center of a pupil of the eye, and
determining a line through the estimated position of the center of the corneal curvature and the estimated position of the center of the pupil;
computing a first estimated position of a center of the eye based on the lines determined for time instances in a first time period, wherein the first time period comprises a first plurality of time instances;
computing a second estimated position of the center of the eye based on the lines determined for time instances in a second time period, wherein the second time period comprises a second plurality of time instances; and
subsequent to computing the first estimated position and the second estimated position, detecting, based on a comparison of the first and second estimated positions of the center of the eye, relocation of the head-mounted device relative to the user's head.

2. The method of claim 1, wherein:
the first estimated position is computed based on an approximated intersection point between the lines determined for time instances in the first time period; and/or
the second estimated position is computed based on an approximated intersection point between the lines determined for time instances in the second time period.

3. The method of claim 1, wherein computing the first estimated position of the center of the eye comprises:
forming a first set of distances between candidate positions and the lines determined for time instances in the first time period;
forming a first cost function based on the first set of distances; and
computing the first estimated position of the center of the eye as a candidate position minimizing the first cost function,
and/or wherein computing the second estimated position of the center of the eye comprises:
forming a second set of distances between candidate positions and the lines determined for time instances in the second time period;
forming a second cost function based on the second set of distances; and
computing the second estimated position of the center of the eye as a candidate position minimizing the second cost function.

4. The method of claim 1, wherein the first and second estimated positions of the center of the eye are computed as positions in a predefined plane.

5. The method of claim 1, wherein the first and second estimated positions of the center of the eye are computed as positions in a plane of an image captured by said camera.

6. The method of claim 4, wherein the positions of the center of the corneal curvature and the positions of the center of the pupil are estimated in said plane, and wherein the lines are determined in said plane.

7. The method of claim 4, wherein:
a) the positions of the center of the corneal curvature and the positions of the center of the pupil are estimated as positions in a three-dimensional space, the lines are determined in the three-dimensional space, and the first and second estimated positions of the center of the eye are computed based on projections of the lines in said plane; or
b) the positions of the center of the corneal curvature and the positions of the center of the pupil are estimated as positions in a three-dimensional space, the lines are determined in the three-dimensional space, and the first and second estimated positions of the center of the eye are computed in the three-dimensional space and are then projected down to said plane.

8. The method of claim 1, wherein the positions of the center of the corneal curvature, the positions of the center of the pupil, and the positions of the center of the eye are estimated as positions in a three-dimensional space.

9. The method of claim 1, wherein at least some of the images of the eye are captured while the eye is illuminated by an illuminator, and wherein, for a time instance, the position of the center of the corneal curvature is estimated based on a position of a reflection of the illuminator at a cornea of the eye in an image captured at that time instance.

10. The method of claim 1, wherein at least some of the images of the eye are captured while the eye is illuminated by an illuminator, and wherein, for a time instance, the position of the center of the pupil is estimated based on a position of the center of the pupil in an image of the eye captured at that time instance and based on a reflection of the illuminator at a cornea of the eye in an image captured at that time instance.

11. The method of claim 1, wherein detecting relocation of the head-mounted device relative to the user's head comprises:
detecting relocation of the head-mounted device in response to a deviation between the first and second estimated positions of the center of the eye exceeding a threshold.

12. The method of claim 1, further comprising:
obtaining images of a second eye captured at the sequence of time instances by a camera of the head-mounted device;
for each of the time instances:
estimating, using at least one image of the second eye captured at that time instance, a position of a center of a corneal curvature of the second eye,
estimating, using at least one image of the second eye captured at that time instance, a position of a center of a pupil of the second eye, and
determining a line through the estimated position of the center of the corneal curvature of the second eye and the estimated position of the center of the pupil of the second eye;
computing a first estimated position of a center of the second eye based on the lines determined for the second eye for time instances in the first time period, wherein the first time period comprises a first plurality of time instances; and
computing a second estimated position of the center of the second eye based on lines determined for the second eye for time instances in the second time period, wherein the second time period comprises a second plurality of time instances,
wherein the detection of relocation of the head-mounted device relative to the user's head is also based on the first and second estimated positions of the center of the second eye.

13. The method of claim 12, wherein detecting relocation of the head-mounted device relative to the user's head comprises:
forming a first distance between the first estimated position of the center of the first eye and the first estimated position of the center of the second eye;
forming a second distance between the second estimated position of the center of the first eye and the second estimated position of the center of the second eye; and
checking that a difference between the first and second distances is below a threshold.

14. The method of claim 1, further comprising, in response to detecting relocation of the head-mounted device relative to the user's head:
providing signaling for calibration of the head-mounted device; or
providing signaling for prompting the user to reposition the head-mounted device.

15. A system for detecting relocation of a head-mounted device relative to a user's head, the system comprising processing circuitry configured to:
obtain images of an eye captured at a sequence of time instances by a camera of the head-mounted device;

for each of the time instances:
    estimate, using at least one image of the eye captured at that time instance, a position of a center of a corneal curvature of the eye,
    estimate, using at least one image of the eye captured at that time instance, a position of a center of a pupil of the eye, and
    determine a line through the estimated position of the center of the corneal curvature and the estimated position of the center of the pupil;
compute a first estimated position of a center of the eye based on the lines determined for time instances in a first time period, wherein the first time period comprises a first plurality of time instances;
compute a second estimated position of the center of the eye based on the lines determined for time instances in a second time period, wherein the second time period comprises a second plurality of time instances; and
subsequent to computing the first estimated position and the second estimated position, to detect, based on a comparison of the first and second estimated positions of the center of the eye, relocation of the head-mounted device relative to the user's head.

16. The system of claim 15, wherein the processing circuitry is configured to:
compute the first estimated position based on an approximated intersection point between the lines determined for time instances in the first time period; and/or
compute the second estimated position based on an approximated intersection point between the lines determined for time instances in the second time period.

17. The system of claim 15, wherein the processing circuitry is configured to compute the first estimated position of the center of the eye by at least:
    forming a first set of distances between candidate positions and the lines determined for time instances in the first time period;
    forming a first cost function based on the first set of distances; and
    computing the first estimated position of the center of the eye as a candidate position minimizing the first cost function,
and/or wherein the processing circuitry is configured to compute the second estimated position of the center of the eye by at least:
    forming a second set of distances between candidate positions and the lines determined for time instances in the second time period;
    forming a second cost function based on the second set of distances; and
    computing the second estimated position of the center of the eye as a candidate position minimizing the second cost function.

18. The system of claim 15, wherein the processing circuitry is configured to compute the first and second estimated positions of the center of the eye as positions in a plane of an image captured by said camera.

19. A head-mounted device comprising the system of claim 15.

20. A non-transitory computer-readable storage medium storing instructions which, when executed by processing circuitry of a system, cause the system to:
obtain images of an eye captured at a sequence of time instances by a camera of a head-mounted device;
for each of the time instances:
    estimate, using at least one image of the eye captured at that time instance, a position of a center of a corneal curvature of the eye,
    estimate, using at least one image of the eye captured at that time instance, a position of a center of a pupil of the eye, and
    determine a line through the estimated position of the center of the corneal curvature and the estimated position of the center of the pupil;
compute a first estimated position of a center of the eye based on the lines determined for time instances in a first time period, wherein the first time period comprises a first plurality of time instances;
compute a second estimated position of the center of the eye based on the lines determined for time instances in a second time period, wherein the second time period comprises a second plurality of time instances; and
subsequent to computing the first estimated position and the second estimated position, to detect, based on a comparison of the first and second estimated positions of the center of the eye, relocation of the head-mounted device relative to a user's head.

* * * * *